United States Patent [19]
Jurgenson et al.

[11] Patent Number: 5,636,089
[45] Date of Patent: Jun. 3, 1997

[54] HEAD SUSPENSION WITH SPACED STATIC ATTITUDE COMPENSATION PROTUBERANCE AND LOAD DIMPLE

[75] Inventors: Ryan A. Jurgenson; Raymond R. Wolter, both of Hutchinson, Minn.

[73] Assignee: Hutchinson Technology Incorporated, Hutchinson, Minn.

[21] Appl. No.: 509,863

[22] Filed: Aug. 1, 1995

[51] Int. Cl.$^6$ .................................................. G11B 5/49
[52] U.S. Cl. ................................................ 360/104
[58] Field of Search .................... 360/103–106; 369/13

[56] References Cited

U.S. PATENT DOCUMENTS

| | | | |
|---|---|---|---|
| 5,019,931 | 5/1991 | Ohwe et al. | 360/104 |
| 5,282,102 | 1/1994 | Christianson | 360/104 |
| 5,282,103 | 1/1994 | Hatch et al. | 360/104 |
| 5,291,359 | 3/1994 | Wolter | 360/104 |
| 5,299,080 | 3/1994 | Mizuno et al. | 360/103 |
| 5,321,568 | 6/1994 | Hatam-Tabrizi | 360/104 |
| 5,331,489 | 7/1994 | Johnson et al. | 360/104 |
| 5,428,490 | 6/1995 | Hagen | 360/104 |
| 5,467,237 | 11/1995 | Takahashi | 360/114 |
| 5,473,488 | 12/1995 | Gustafson et al. | 360/104 |
| 5,490,027 | 2/1996 | Hamilton et al. | 360/104 |
| 5,504,640 | 4/1996 | Hagen | 360/104 |

FOREIGN PATENT DOCUMENTS

| | | |
|---|---|---|
| 62-65275 | 3/1987 | Japan . |
| 63-90084 | 4/1988 | Japan . |

OTHER PUBLICATIONS

J. C. Harrision et al.; The Double Dimple Magnetic Recording Head Suspension and Its Effect on Fly Height Variability; Journal of Tribology; Feb. 21, 1994, revised Jul. 1, 1994; pp. 1–5.

*Primary Examiner*—Jefferson Evans
*Attorney, Agent, or Firm*—Faegre & Benson

[57] ABSTRACT

A head suspension assembly for supporting a head slider from an actuator arm in a disk drive includes a load beam having a flexure tongue configured with a static offset error correction protuberance which extends from the slider-engaging surface of the flexure tongue. A load point dimple extends from the distal end of the load beam at a location spaced longitudinally along the axis of the HSA from the flexure tongue and from the static offset error correction protuberance, for engaging and applying a load to a head slider mounted to the flexure tongue. The static offset error correction protuberance and the load point dimple together function to reduce and/or eliminate static pitch offset error and static roll offset error.

11 Claims, 4 Drawing Sheets

HEAD SUSPENSION WITH SPACED STATIC ATTITUDE COMPENSATION PROTUBERANCE AND LOAD DIMPLE

FIELD OF THE INVENTION

This invention relates to a suspension for supporting a head slider from an actuator arm in a disk drive. The suspension includes a load beam having a flexure tongue configured with a static offset error correction protuberance which extends from the slider-engaging surface of the flexure tongue. A load point dimple extends from the distal end of the load beam at a location spaced from the flexure tongue and from the static offset error correction protuberance, for engaging and applying a load to a head slider mounted to the flexure tongue. The static offset error correction protuberance and the load point dimple together function to reduce and/or eliminate static pitch offset error and static roll offset error.

BACKGROUND OF THE INVENTION

The component elements of standard head suspension assemblies (HSAs) include a base plate, a resilient region, a load beam, a flexure and a head slider. The base plate is positioned at a proximal end of the load beam, adjacent to the resilient region, and is configured for mounting the load beam to an actuator arm of a disk drive. The flexure is positioned at a distal end of the load beam. Mounted to the flexure is a head slider with a read/write head mounted thereon, which is thereby supported in read/write orientation with respect to an associated disk. The base plate, the resilient region, the load beam and the flexure can each be configured as separate elements attached to each other, or two or more adjacent elements may together be configured as a single, one-piece element to which other elements or components of the HSA are attached.

A conventional flexure, sometimes referred to as a Watrous gimballing flexure, is a single element configured with a pair of outer flexible arms about a central aperture with a cross piece extending across and connecting the arms at a distal end of the flexure. A flexure tongue is joined to the cross piece and extends proximally from the cross piece into the aperture. A free end of the tongue is centrally located between the flexible arms. The head slider is mounted to the free end of the flexure tongue.

The head slider is mounted to the flexure tongue so that the plane of the air bearing surface of the head slider is in a predetermined (e.g., planar and parallel) relationship to the plane of the disk surface. During manufacturing and assembling of the HSA, any lack of precision in forming or assembling the individual elements contributes to a lack of planarity in the surfaces of the elements. A buildup of such deviations from tolerance limits of planarity and other parameters in the individual elements can cause deviation from desired planar parallelism to the associated disk surface in the final HSA. The parameters of static roll and static pitch torque in the final HSA result from these inherent manufacturing and assembly tolerance buildups.

Ideally, for optimum operation of the disk drive as a whole, during assembly of the head slider to the flexure tongue, the plane of the load beam mounting surface datum (to which the load beam is mounted during HSA assembly) and the plane of the head slider air bearing surface datum must be in a predetermined relationship to each other. The load beam mounting surface datum and the head slider air bearing surface datum are planar surfaces used as reference points or surfaces in establishing the planar parallelism of the plane of the actuator mounting surface and the plane of the air bearing surface of the head slider surface relative to each other. The upper and lower planar surfaces of the head slider are also manufactured according to specifications requiring them to be essentially or nominally parallel to each other.

Static roll torque and static pitch torque have their rotational axes about the center of the head slider in perpendicular directions, and are caused by unequal forces acting to maintain the desired planar parallelism on the head slider while it is flying over the disk. That is, static torque is defined as a torque or a moment of force tending to cause rotation to a desired static (i.e., reference) attitude about a specific axis (in this case, the roll axis or the pitch axis of the HSA).

As applied to an HSA, the axis of static roll torque is coincident with the longitudinal axis of the HSA. The value of static roll torque is measured on either side of the static roll torque axis when the plane of the flexure tongue is in a predetermined relationship (ideally parallel) with the plane of the base plate. If the flexure has been twisted about the static roll torque axis during manufacture (i.e., there is planar non-parallelism of the flexure tongue with respect to the disk along this axis), the values measured on either side of the roll torque axis will not be the same. Thus, when the attached head slider is in flying attitude to the associated disk surface, a force (referred to as an induced roll torque value) is needed to twist the tongue back into planar parallel alignment to the disk.

The axis of pitch torque is perpendicular to the longitudinal axis of the HSA, and thus to the axis of roll torque. The value of static pitch torque is measured on either side of the static pitch torque axis when the plane of the flexure tongue is in a predetermined relationship (ideally parallel) with the plane of the base plate. If the flexure has been twisted about the static pitch torque axis during manufacture (i.e., there is planar non-parallelism of the flexure tongue with respect to the disk along this axis), the values measured on either side of the pitch torque axis will not be the same. Thus, when the attached head slider is in flying attitude to the associated disk surface, a certain force (referred to as an induced pitch torque value) is needed to twist the tongue back into planar parallel alignment to the disk. It will of course be understood that under actual conditions the flexure may need to be twisted with respect to both axes, to achieve alignment about both the pitch axis and the roll axis.

These torques can also be referred to in terms of static attitude at the flexure/slider interface and in terms of the pitch and roll stiffness of the flexure. The ideal or desired pitch and roll torques are best defined as those which would exist if the components were installed in a predetermined relationship (ideally, planar parallel) configuration in a disk drive. In an actual disk drive, pitch and roll static torques produce adverse forces between the air bearing surface of the slider and the disk, affecting the flying height of the slider above the disk, resulting in deviations from optimum read/write and head/disk interface separation.

In a conventional flexure design, the flexure tongue is offset from the flexure toward the head slider to allow gimballing clearance between the upper surface of the head slider and the lower surface of the flexure. This offset is formed where the flexure tongue and cross piece join, in conjunction with forming the dimple on the flexure tongue. This standard flexure design evidences a low value of pitch stiffness and a moderate value of roll stiffness. Pitch stiffness and roll stiffness are each measured in force X distance/ degree. Thus, in developing a new design for a flexure, it would be most desirable to provide a flexure and a method of fabrication which would accurately compensate and correct for manufacturing variations that currently contribute to static pitch and roll torque errors. The manufacturing process should be efficient to perform corrections for both static roll torque and for static pitch torque, since the ability to correct for both static torques is needed for proper flexure/ slider alignment.

For years, the disk drive industry has been striving to reduce static attitude error and to thereby make head sliders fly more consistently. Several potential solutions to the problem of static attitude error have been proposed. One potential solution involves bringing the head slider and the flexure bond pad into close proximity to each other in the desired attitudinal relationship, and then fixing them together in the aligned position with adhesive. The adhesive would become a structural element of the HSA used to fill voids and to do "difficult" bonds.

Harrison, at al., in The Double Dimple Magnetic Recording Head Suspension and Its Effect on Fly Height Variability, *Transactions of the American Society of Mechanical Engineers; Journal of Tribology*, 94-Trib-39, 1994, describes a Double Dimple suspension assembly. According to Harrison, et al., the head slider mounting surface on the underside of the flexure has a dimple which is convex to the confronting surface of the head slider. The dimple on the flexure has a concave surface which is positioned to confront the convex surface of the load bearing dimple on the load beam. The radius of curvature of the dimple on the flexure is larger than the radius of curvature of the load bearing dimple on the load beam, so that there is a single point of contact between the convex surface of the load bearing dimple on the load beam and the concave surface of the dimple on the flexure. The head slider is allowed to pivot about the convex surface of the dimple on the flexure during assembly to achieve mutual planar parallelism between the plane of the head slider air bearing surface and the plane of the load beam mounting surface. Then, gaps between the head slider and gimbal flexure around the flexure dimple are filled with bonding adhesive. Thus, during assembly, the mounting surface of the head slider is said to register to the convex surface of the dimple without twisting the flexure. The pivoting necessary for the head slider to follow undulations of the disk after assembly and during operation is said to occur at the point of contact between the concave surface of the dimple on the flexure and the convex surface of the load dimple on the load beam.

Although the Harrison Double Dimple concept offers certain advantages, having the load point and bond out feature nested contributes added complexity to the construction and assembly of the HSA. Also, if the individual elements are misaligned, an additional torque can be contributed due to the nested misalignment. It may be possible that this new torque is exactly correct to obtain proper flyheight, but, in order to do so, the bonding must be done at the precisely correct Z-height.

SUMMARY OF THE INVENTION

The present invention is a suspension for supporting a head slider from an actuator arm in a disk drive. The suspension includes the following features. A load beam of the suspension has a distal end and a proximal end. A base is provided on the proximal end of the load beam for mounting the suspension to the disk drive actuator arm. A flexure tongue resiliently extends from the distal end of the load beam. The flexure tongue has a slider-engaging surface configured for mounting to a head slider, and a static offset error correction protuberance extending from the slider-engaging surface. A load point dimple extends from the distal end of the load beam at a location spaced from the flexure tongue and from the static offset error correction protuberance for engaging and loading a head slider mounted to the tongue.

The present invention also includes a method for mounting a head slider to the above described suspension. An assembly fixture is provided which includes a load beam datum surface configured to receive the proximal end of the load beam and a head slider air bearing datum surface configured to receive the air bearing surface of the head slider. The load beam and head slider air bearing datum surfaces are positioned and oriented with respect to one another in order to position and orient the load beam and the head slider in a predetermined relationship to each other. The load beam is rigidly positioned on the load beam datum. The head slider is rigidly positioned on the slider air bearing surface datum. With the load beam and head slider in this predetermined relationship, the head slider is mounted to the static offset error correction protuberance on the head-engaging surface of the flexure tongue.

DETAILED DESCRIPTION OF THE INVENTION

Figure 1:
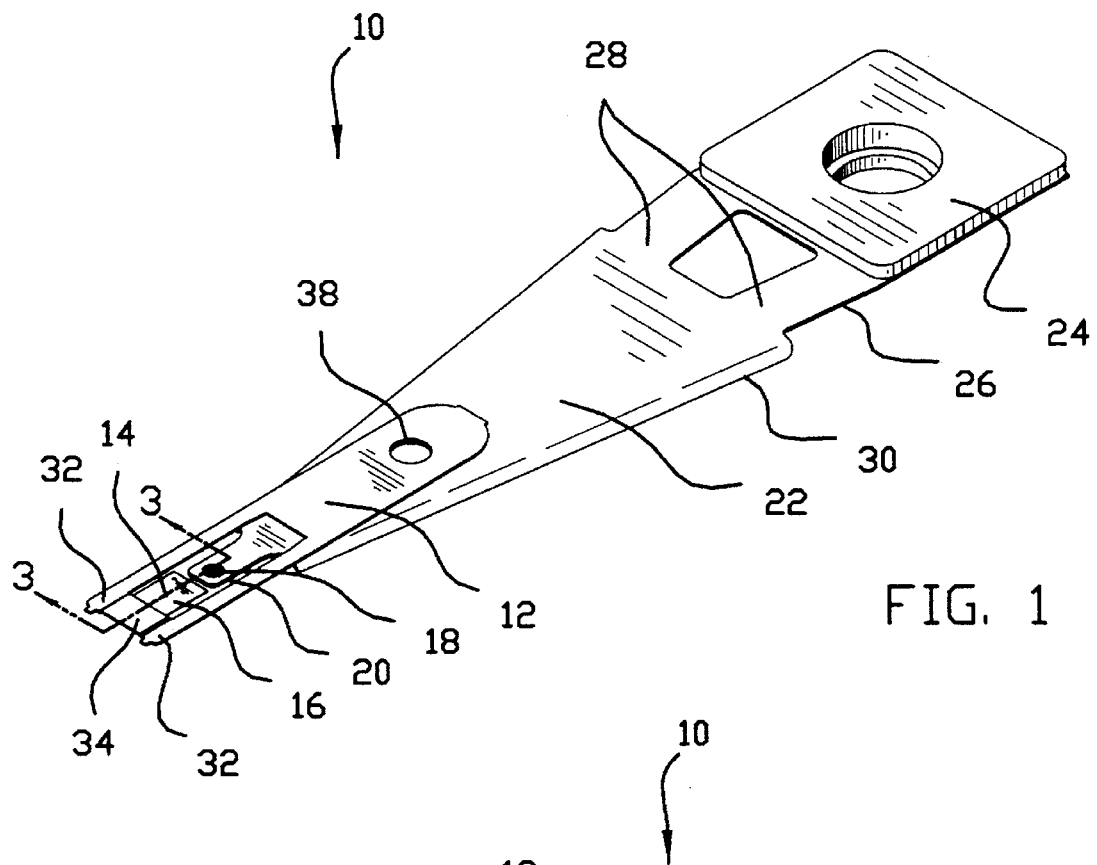
FIG. 1 is an isometric view of an HSA of the present invention having a flexure configured with a static offset error correction protuberance on the flexure tongue and a load point on the distal end of the load beam.

FIGS. 1-5 illustrate a first embodiment of the present invention. FIG. 1 is an isometric view of an HSA 10 of the present invention having a flexure 12 configured with a static offset error correction protuberance 14 shaped as a tower. The static offset error correction protuberance or tower 14 extends from the head slider-engaging surface of the flexure tongue 16, and a load point dimple 18 extends from the distal end 20 of the load beam 22 at a location spaced from the flexure tongue 16 and from the static offset error correction protuberance 14. As shown in FIGS. 1-5, the spacing between the static offset error correction protuberance 14 and load point dimple 18 is along the longitudinal axis of the HSA 10. The HSA 10 is also configured with a base plate 24 attached to the actuator mounting surface 25 for mounting to an actuator arm (not shown), a resilient region 26 configured with a cut-out to define two outer resilient legs 28, and perimeter rails 30 to lend rigidity to the length of the load beam 22. The outer flexible arms 32 of the flexure 12 are connected at their distal ends by a cross-piece 34 elevated from the plane of the flexure 12 and the flexible arms 32. The flexure tongue 16 extends proximally from the cross-piece 34 and is similarly elevated from the plane of the flexure 12 and the flexible arms 32. The proximal end of the flexure 12 is provided with an aperture 38 to serve as a locating feature during assembly of the HSA 10.

Figure 2:
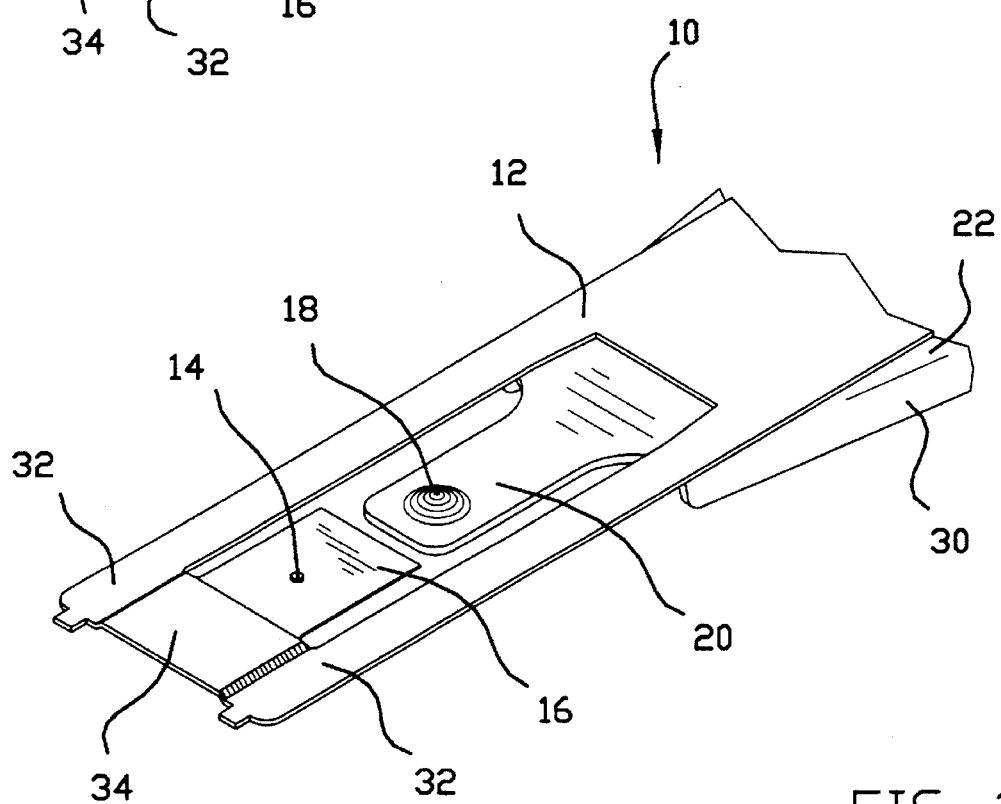
FIG. 2 is an enlargement of distal portions of the load beam and the flexure of FIG. 1.

FIG. 2 is an enlargement of distal portions of the load beam 22 and the flexure 12 of FIG. 1.

Figure 3:
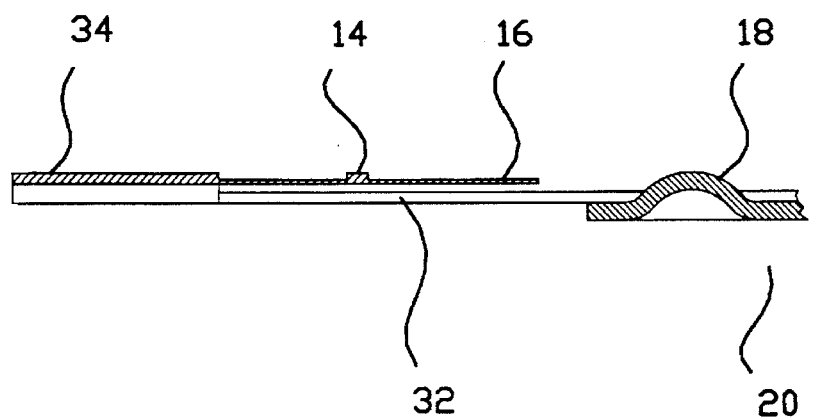
FIG. 3 is a cross-sectional profile of the HSA of FIG. 1 taken along the line 3—3.

FIG. 3 is a cross-sectional profile of the HSA 10 of FIG. 1 taken along the line 3—3. Visible in FIG. 3 are the static offset correction protuberance or tower 14 configured on the flexure tongue 16 and the load point dimple 18 configured on the distal end 20 of the load beam 22. By masking and partially etching the flexure tongue 16, the flexure tongue 16 is reduced to a uniform partial thickness, leaving a full-thickness static offset correction protuberance or tower 14. In the cross-sectional profile of FIG. 3, it can be seen that the cross-piece 34, with the attached proximally extending flexure tongue 16, is elevated from the plane of the flexure 12 and the flexible arms 32. The load point dimple 18 is formed from the plane of the distal end 20 of the load beam 22.

Figure 4:
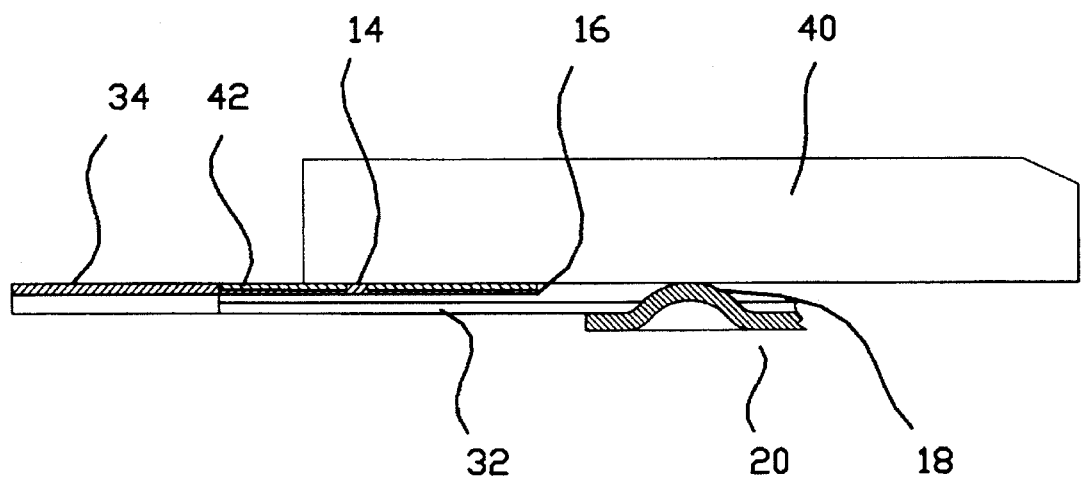
FIG. 4 is a cross-sectional profile similar to that of FIG. 3, showing a head slider adhesively bonded to the static offset error correction protuberance.

FIG. 4 is a cross-sectional profile similar to that of FIG. 3, showing the HSA of FIGS. 1–3 with a head slider 40 secured to the static offset error correction protuberance or tower 14 by means of an adhesive bond material 42. The load point dimple 18 is shown in position to apply a load to the head slider 40.

Figure 5:
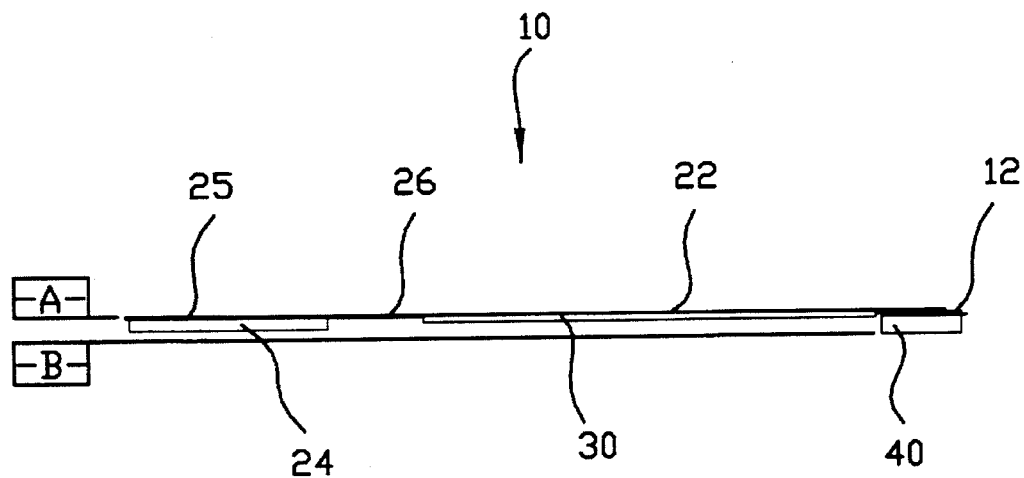
FIG. 5 is a cross-sectional profile of the HSA of FIG. 1 with a head slider attached thereto, showing the reference load beam mounting surface datum A and head slider air bearing reference surface datum B.

FIG. 5 is a cross-sectional profile of the HSA 10 of FIGS. 1–4 with a head slider 40 attached thereto, showing the load beam mounting surface datum A and the head slider air bearing surface datum B. Ideally, for optimum operation of the disk drive as a whole, during assembly of the head slider 40 to the flexure tongue 16, the plane of the load beam mounting surface datum A (to which the load beam 22 is mounted during HSA 10 assembly) and the plane of the head slider air bearing surface datum B must be in a precise predetermined relationship (typically parallel) to each other. The load beam mounting surface datum A and the head slider air bearing surface datum B are planar surfaces used as reference points or surfaces in establishing the planar parallelism of the plane of the actuator mounting surface 25 and the plane of the air bearing surface of head slider 40 relative to each other.

Figure 6:
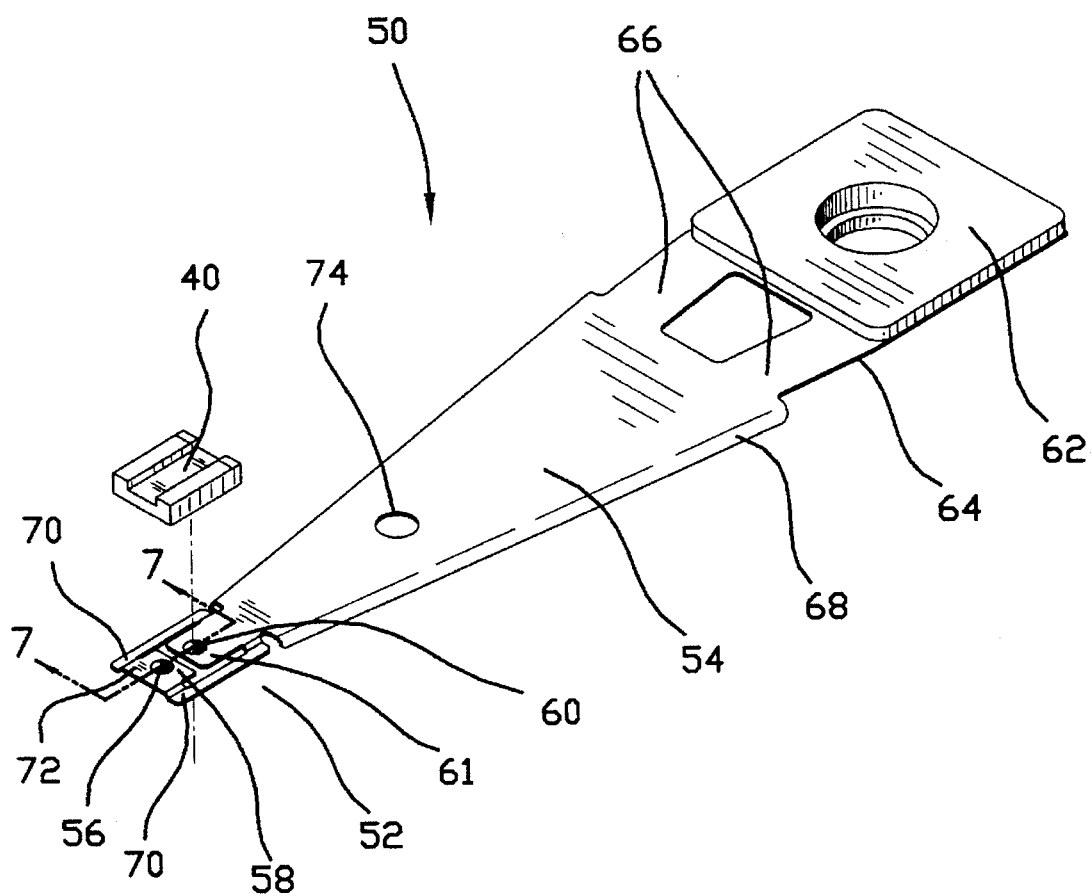
FIG. 6 is an isometric view of another HSA of the present invention having a single element configured with a flexure region and a load beam region, with a static offset error correction protuberance on the tongue of the flexure region and a load point dimple on the distal end of the load beam region.

FIG. 6 illustrates an isometric view of another HSA 50 according to the present invention having a single element configured with a flexure region 52 and a load beam region 54. A static offset error correction protuberance 56 extends from the tongue 58 at the distal end of the flexure region 52. A load point dimple 60 extends from the proximal tongue 61 at the distal end of the load beam region 54. The load point dimple 60 is at a location spaced from the flexure tongue 58 and from the static offset error correction protuberance 56 along the longitudinal axis of the HSA 50. Note that the static offset error correction protuberance 56 is shaped as a dimple, similar in configuration to the load point dimple 60. The static offset error correction protuberance may also be an etched tower as in FIG. 2. The single element of the HSA 50 is also configured with a base plate region 62 for mounting to an actuator arm (not shown), a resilient region 64 configured with a cut-out to define two outer resilient legs 66, and perimeter rails 68 to lend rigidity to the length of the load beam region 54. The outer flexible arms 70 of the flexure region 52 are connected at their distal ends by a cross-piece 72. The tongue 58, extending proximally from the cross-piece 72, is co-planar with the cross-piece 72, with the tongue 61 and with the load beam region 54. If the width of the slider overlaps the arms 70, the outer flexible arms 70 must be recessed from the plane of the tongue 58, the tongue 61 and the load beam region 54. The load beam region 54 is provided with an aperture 74 to serve as a locating feature in assembly of the HSA 50. Also shown in FIG. 6 is head slider 40 shown in position for assembly with HSA 50.

Figure 7:
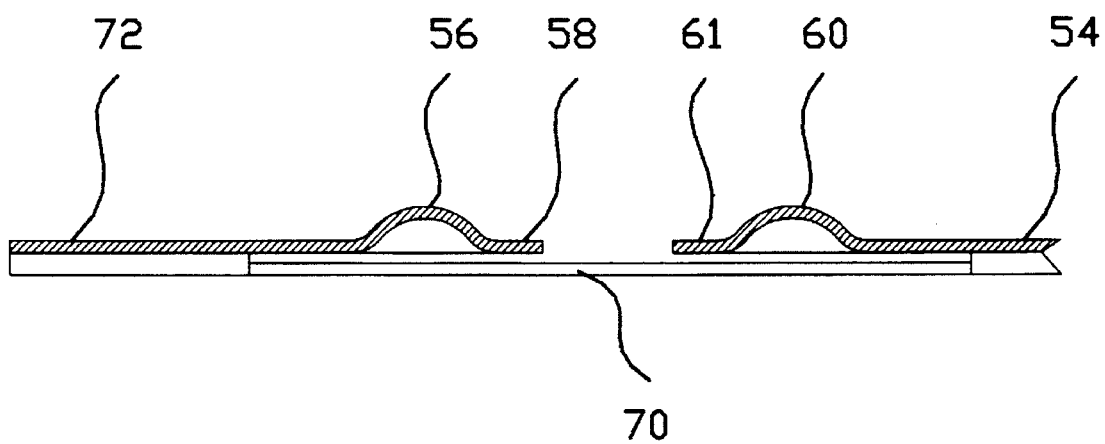
FIG. 7 is a cross-sectional profile of the HSA of FIG. 6 taken along the line 7—7.

FIG. 7 is a cross-sectional profile of the HSA of FIG. 6 taken along the line 7—7. Visible in FIG. 7 are the static offset correction dimple 56 configured on the tongue 58 and the load point dimple 60 configured on the tongue 61 at the distal end of the load beam region 54. In the cross-sectional profile of FIG. 7, it can be seen that the outer flexible arms 70 are recessed from the plane of the load beam region 54, the tongue 61, the cross-piece 72, and the tongue 58. The load point dimple 60 is formed from the plane of the tongue 61 and the static offset correction dimple 56 is formed from the plane of the tongue 58.

For assembling the head slider 40 to the HSA 10, 50 with a flexure 12, 52, respectively, according to the present invention, a load beam mounting datum surface A and a head slider air bearing surface datum surface B are provided in a predetermined (typically parallel) planar relationship to each other and separated vertically a specified amount, as illustrated in FIG. 5. The load beam 22, 54, provided with a flexure 12, 52 of the present invention, is located with regard to the load beam datum surface A, and the air bearing surface of head slider 40 is located with regard to the head slider air bearing surface datum surface B. With the load beam 22, 54 (and attached flexure 12, 52) and the head slider 40 in this predetermined relationship to each other, and with the static offset error correction protuberance 14, 56 and the head slider 40 in point contact with each other, the head slider 40 is adhesively mounted to the static offset error correction protuberance 14, 56 on the head-engaging surface of the flexure tongue 16, 58, with the adhesive filling the gap between the flexure tongue 16, 58 and the head slider 40 around the static offset error correction protuberance 14, 56.

Due to the single point contact between the static offset error correction protuberance 14, 56 on the flexure tongue 16, 58 and the head slider 40, the head slider 40 can pivot about the static offset error correction protuberance 14, 56 to achieve the alignment of the head slider 40 to the load beam 22, 54 set by the load beam mounting datum surface A and the head slider air bearing mounting datum surface B. Compensation is thus provided for any static torque offset errors between the tongue 16, 58 and the head slider 40 along the roll and/or pitch axes. The adhesive bond between the head slider 40 and the flexure tongue 16, 58 can be of varying thickness around the static offset error correction protuberance 14, 56 and between the head-engaging surface of the flexure tongue 16, 58 and the head slider 40. The adhesive bond absorbs or compensates for both static roll and pitch attitude error at the time of assembly, removing or substantially eliminating any errors due to static roll and pitch torque from the final HSA 10, 50.

According to the present invention, the load point function is separated from the bond out function. Because the bond area and the bond out feature are offset from the load point in the pitch direction, there may be some residual pitch torque in an HSA according to the present invention. However, since the load point and the bond out point are aligned in the roll direction, an HSA of this invention should have minimal roll torque.

What is claimed is:

1. A suspension for supporting a head slider from an actuator arm in a disk drive, the suspension including:

a load beam having a distal end and a proximal end;

a base on the proximal end of the load beam, for mounting the suspension to the disk drive actuator arm;

a flexure tongue resiliently extending from the distal end of the load beam, the flexure tongue including:

a head slider-engaging surface configured for mounting to a head slider; and a static offset error correction protuberance extending from the head slider-engaging surface; and a load point dimple extending from the distal end of the load beam at a location spaced from the flexure tongue and the static offset error correction protuberance, for engaging and loading a head slider mounted to the flexure tongue;

wherein the load point dimple and the static offset correction protuberance are spaced from one another along a longitudinal axis of the load beam.

2. The suspension of claim 1 wherein:

the flexure tongue has a free end extending from the distal end of the load beam toward the proximal end of the load beam; and the load point dimple extends from the load beam at a location between the free end of the tongue and the proximal end of the load beam.

3. The suspension of claim 2 wherein the flexure tongue and load beam are an integral, one-piece member.

4. The suspension of claim 3 and further including adhesive for bonding the head slider to the head slider-engaging surface of the flexure tongue.

5. The suspension of claim 2 wherein the flexure tongue extends from a flexure base, and the flexure base is mounted to the distal end of the load beam.

6. The suspension of claim 1 and further including a head slider mounted to the head slider-engaging surface of the flexure tongue.

7. The suspension of claim 1 wherein the static offset correction protuberance includes an etched tower.

8. The suspension of claim 1 wherein the static offset correction protuberance includes a formed dimple.

9. The suspension of claim 1 wherein the static offset correction protuberance and load point dimple are spaced from one another along a central longitudinal axis of the load beam.

10. A method for mounting a head slider to the suspension of claim 1, including:

providing an assembly fixture including a load beam datum surface configured to receive the proximal end of the load beam and a head slider air bearing surface datum configured to receive the head slider, the load beam and slider air bearing datum surfaces positioned and oriented with respect to one another to position and orient the load beam and the head slider in a predetermined relationship to each other;

rigidly positioning the load beam on the load beam datum;

rigidly positioning the head slider on the head slider air bearing surface datum; and mounting the head slider to the static offset error correction protuberance on the head-engaging surface of the flexure tongue with the load beam and head slider in the predetermined relationship.

11. The method of claim 10, wherein mounting the head slider to the static offset error correction protuberance on the head-engaging surface of the flexure tongue includes bonding the head slider to the head-engaging surface of the flexure tongue with adhesive, with the static offset error correction protuberance in point contact with the head slider, with the load beam and the head slider in the predetermined relationship, and with first and second axis static offset errors compensated for by an adhesive bond of varying thickness around the static offset error correction protuberance and between the head-engaging surface of the flexure tongue and the head slider.

* * * * *